(12) United States Patent
Heidenback et al.

(10) Patent No.: US 7,123,132 B2
(45) Date of Patent: Oct. 17, 2006

(54) CHASSIS ALIGNMENT SYSTEM

(75) Inventors: Claes Heidenback, Västerås (SE); Christer Johansson, Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/415,164

(22) PCT Filed: Oct. 26, 2001

(86) PCT No.: PCT/SE01/02375

§ 371 (c)(1),
(2), (4) Date: Jan. 6, 2004

(87) PCT Pub. No.: WO02/34663

PCT Pub. Date: May 2, 2002

(65) Prior Publication Data

US 2004/0125985 A1    Jul. 1, 2004

(51) Int. Cl.
 *G08B 21/00* (2006.01)
 *B66C 13/16* (2006.01)

(52) U.S. Cl. .............. 340/431; 340/555; 340/686.1; 340/685; 340/686.2; 180/271; 250/539.3; 414/340; 414/141.3; 414/377; 701/50; 212/276; 356/400

(58) Field of Classification Search .............. 340/685, 340/686.1, 686.2, 686.6, 665, 666, 425.5, 340/555, 556, 557, 431; 180/167, 271, 290; 250/200, 559.29, 559.3; 414/337, 340, 139.5, 414/141.3; 701/1, 2, 50; 212/276, 278, 212/279, 281, 277; 382/104; 356/399, 400, 356/401, 614

See application file for complete search history.

(56) References Cited

U.S. PATENT DOCUMENTS

| | | | | |
|---|---|---|---|---|
| 5,142,658 A | * | 8/1992 | McMorran et al. | 382/104 |
| 5,661,465 A | * | 8/1997 | Hung et al. | 340/686.2 |
| 5,729,453 A | * | 3/1998 | Lee et al. | 701/50 |
| 6,648,156 B1 | * | 11/2003 | Bryfors et al. | 212/270 |
| 2004/0030478 A1 | * | 2/2004 | Holland et al. | 701/50 |

FOREIGN PATENT DOCUMENTS

| | | |
|---|---|---|
| DE | 36 06 363 | 9/1987 |
| DE | 199 16 999 | 10/2000 |

* cited by examiner

Primary Examiner—Donnie L. Crosland
(74) Attorney, Agent, or Firm—Venable LLP; Eric J. Franklin

(57) ABSTRACT

A method for aligning a truck chassis with a required position relative to a crane, in which the truck is scanned by a sensor means. The laser scanner is located on the crane in such a way that it will be able to scan at least one of a plurality of loading/unloading lanes. The truck is scanned when it enters into one of the loading/unloading lanes in order to detect/identify at least one edge of the truck. The distance between the identified edge of the truck and a fixed point on the crane is measured. A signal is generated that enables a truck driver to drive the truck into a required position in the loading/unloading lane for accurately receiving or delivering a container.

28 Claims, 5 Drawing Sheets

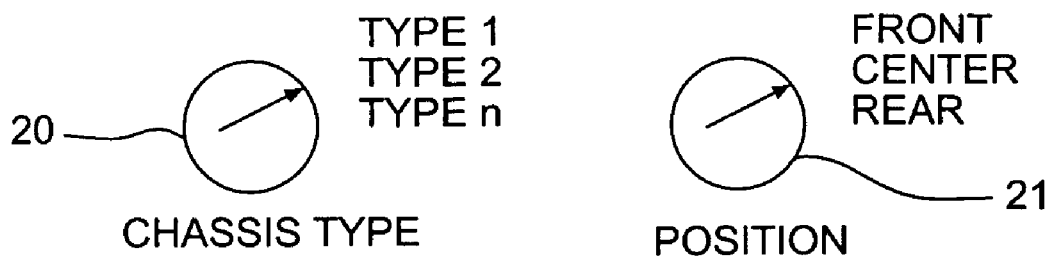
FIG. 3a  FIG. 3b
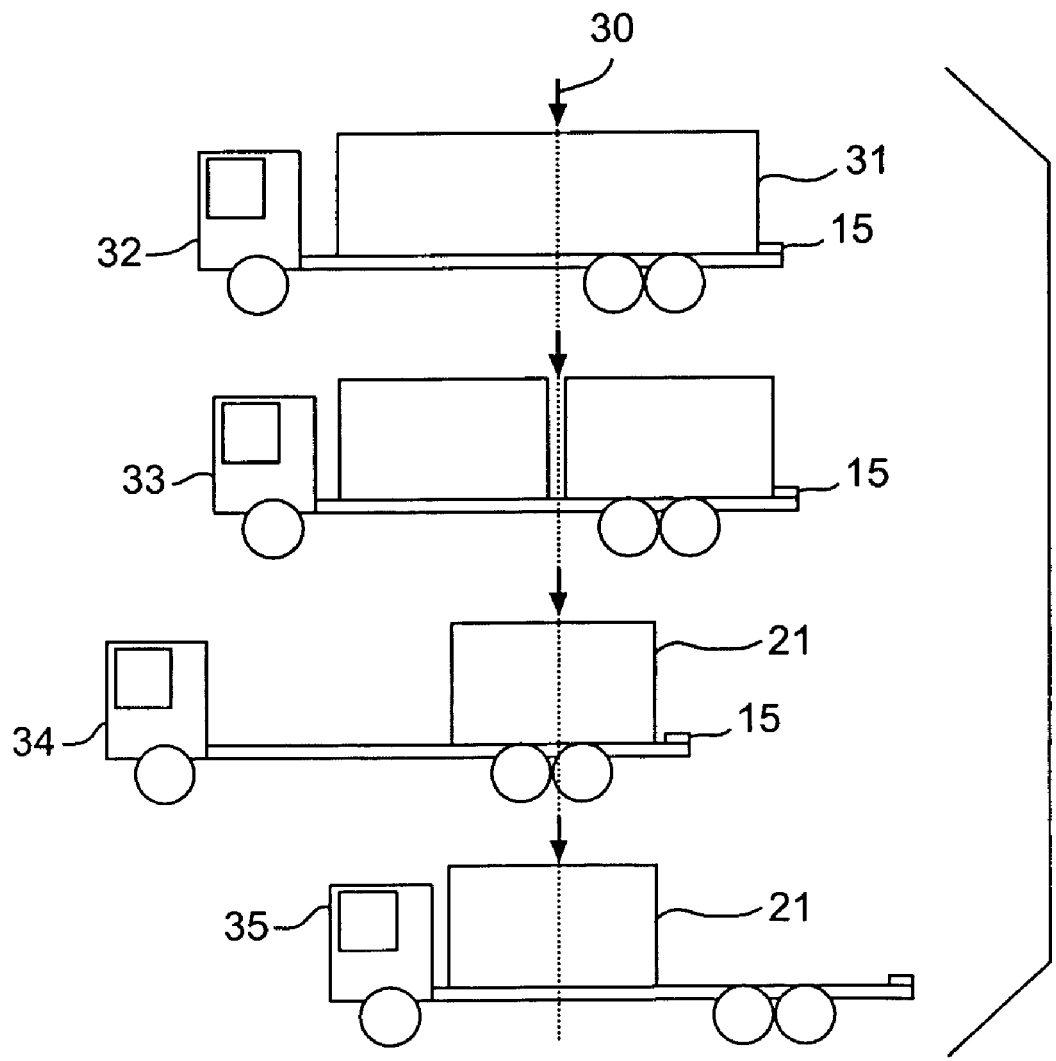
FIG. 4a

CHASSIS ALIGNMENT SYSTEM

TECHNICAL AREA

This invention relates to a system and a method for positioning a container held by a crane. In particular, but not exclusively, the invention is a method and system for aligning a chassis of a truck or other vehicle for carrying containers such that a container may be landed on, or picked up from, the vehicle by a crane.

TECHNICAL BACKGROUND

A vast amount of freight is shipped around the world in standard shipping containers. At each point of transfer from one transport means to another, for example in ports and harbours, there is a tremendous number of containers that must be unloaded, transferred to a temporary stack, and later loaded on to another ship or to another form of transport. To achieve the shortest unloading and loading times container handling equipment has to be partly and/or preferably completely automated in normal operation.

The technical demands of handling containers are great. The tare weight of containers is usually consistent, but the gross weight varies considerably. The width of shipping containers is standardised at 8 ft, but the height varies between from 8 and 9.5 ft. The most common standard lengths are 20 ft and 40 ft long. The 40 ft container is very common today and even longer containers up to 53 ft long are also in use.

A container may be handled by a crane, a crane moving on rails, a self-propelled container handling apparatus, or a lift or winch of any type all of which are referred to herein as a crane. Each crane has a lifting device usually incorporating a spreader of some kind that directly contacts a container, to grip it, lift it, lower it and release it. In this description the term spreader is used to denote a part of a lifting device that is in direct contact with a container. Spreaders are normally designed to handle more than one size of container, typically 20–40 ft or 20–40–45 ft long containers. Cranes and other automatic container handling apparatuses and systems are used to speed up the process of loading and unloading containers transferred from one point to another.

The point of transfer of a container between a crane and a truck can be a source of delay. Usually a crane is positioned over one or more parallel loading/unloading lanes on which a truck or other vehicle, hereafter called a truck chassis, stands to receive a load from or unload a container to the crane. The crane is usually arranged such that it has limited freedom to move the spreader in the direction parallel to the long axis of the loading/unloading lanes and it is important that the truck driver positions the truck chassis accurately under the crane. Inaccurate positioning of the truck chassis leads to delay in the process of transferring containers.

U.S. Pat. No. 5,142,658 describes a container chassis positioning system. The system uses a video camera to capture images of a truck chassis which are then compared by a computer to stored templates corresponding to known parts of known types of truck. The images are processed as gray scale images and matched using methods of statistical probability to determine a close match. A relative position of the truck and the container is determined and the exact stopping point is signaled to the driver of the truck. The signaling is carried out by means of a number of lamps in a system that light up progressively to indicate as the truck has drives up to the correct position.

However, processing of video images and gray scale images require. substantial computer processing power to process such images quickly. Moreover it can be difficult in practice to recognize a truck chassis using video imaging based on graphic images such as gray scale. The color intensity of chassis parts photographed against a background of asphalt varies according to degree of sunlight and shade, color of truck chassis, and color contrast between them. It can be difficult, especially in poor light or adverse weather conditions, to recognize a truck chassis using video based images of that type without resorting in addition to fixing lamps or highly reflective signs or markers to the chassis to be obtain a fast and certain recognition.

SUMMARY OF THE INVENTION

It is an aim of the invention to enable a driver of a truck chassis to position the truck accurately to receive a container.

It is another aim of the invention to enable positioning of a truck chassis to receive a container onto one of a plurality of loading positions on the truck chassis.

According to different aspects of the invention there is provided a method, a system, a computer program product.

The principle advantage provided by the invention is that it provides an accurate system to recognize a truck chassis quickly and easily, even in poor light or adverse weather conditions. This facilitates speed automatic handling of containers. The invention may be used on standard vehicles without first mounting special signs or light reflective markers at particular points on the truck in order for automatic recognition to function properly. This also means that there the system according to the invention will continue to function in conditions where a sign or marker would become obscured, such as by rain or dirt.

The invention relies on a three-dimensional (3-D) laser camera to scan an object and measure a distance between a fixed point, or the camera, and the measured object. The scanned image depends on distance to physical objects, not on the color or color contrast of different objects. By this means the invention provides a fast and accurate system and method to measure distance to a truck chassis or container.

The invention also enables a correct position to be signaled to a truck driver so that he/she can position a truck chassis correctly for a loading position regardless of whether it is on the front, rear or middle of the truck chassis. In this respect the invention enables speedy transfer of containers to and from a truck chassis regardless of a whether containers have the same or different lengths.

A particular advantage and a great benefit of the system is that CAS has an overview of all lanes and can guide the truck drivers in the right order, depending on the upcoming job. The time to determine the chassis position may be on the order of approximately 1 s in crane direction, and 2 s in trolley direction, which makes the positioning rather fast, compared to a manual adjustment. It consists only of one sensor and a truck driver guiding light bar. In advantageous embodiments, CAS has an interface for both an automatic positioning system and a fully manual crane control, which makes it flexible enough to be used with new cranes or older existing cranes. The 3-D laser technology is robust and reliable in all weather conditions.

The CAS 3-D laser system is class 1, which makes it safe for people working under the crane and in its surroundings.

The invention may be applied to existing installations as well as new installations. When combined with automatic crane control systems that can accept positioning data from the CAS system, automated landing of containers is further aided.

BRIEF DESCRIPTION OF THE DRAWINGS

Embodiments of the invention will now be described, by way of example only, with particular reference to the accompanying drawings in which:

FIG. 3a is a schematic diagram of a selector arrangement for selecting chassis type;

FIG. 3b is a schematic diagram of a load position selector arrangement according to an embodiment of the invention;

FIG. 4a is a schematic diagram of a plurality of measurement positions related to different load positions on a truck chassis;

DETAILED DESCRIPTION OF THE EMBODIMENTS

Figure 1:
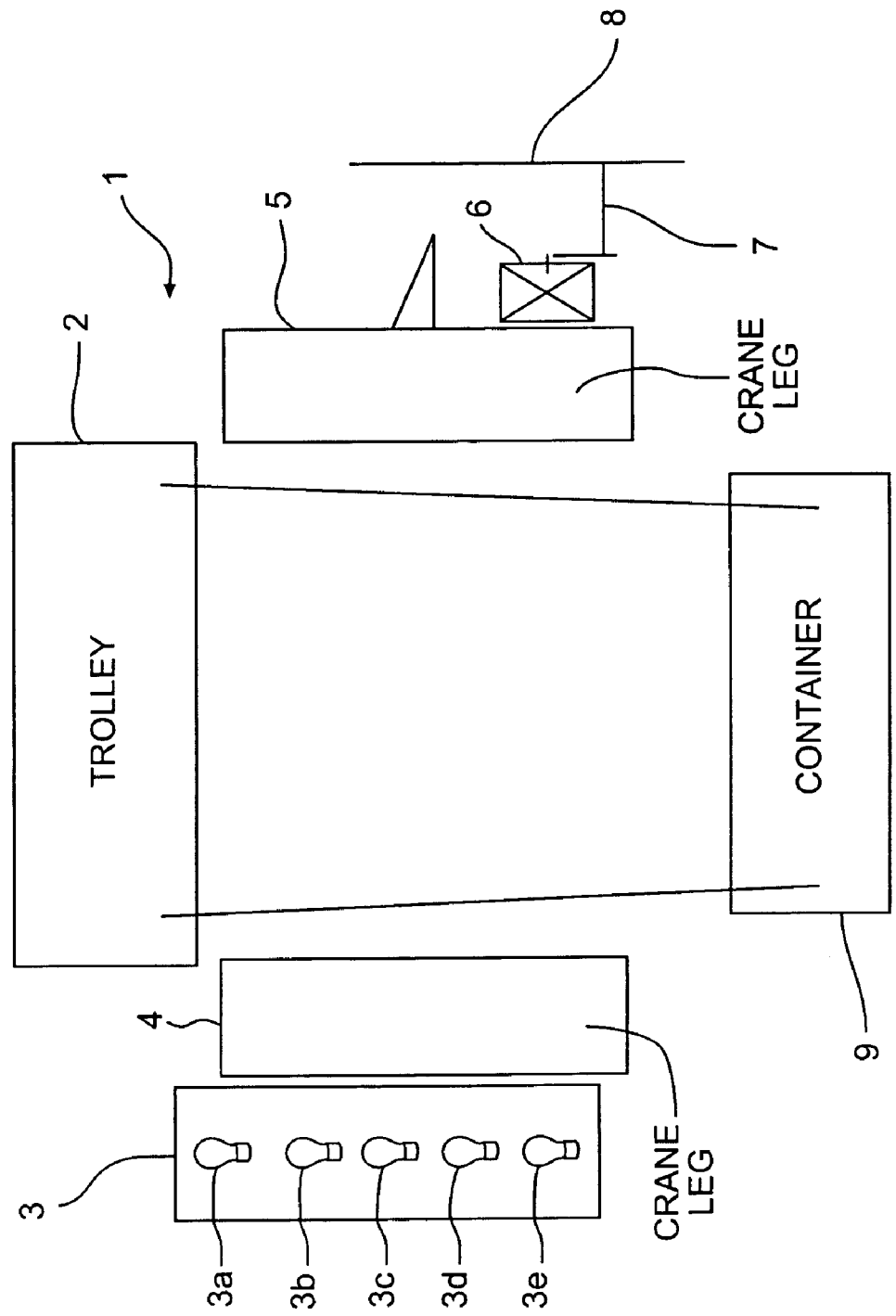
FIG. 1 is a schematic diagram of one mounting position for a system according an embodiment of the invention.

FIG. 1 shows a ship to shore crane seen from behind. A chassis alignment system (CAS) according to an embodiment of the invention is shown schematically mounted on the ship to shore crane. The figure shows a trolley 2, an indicator bar 3, two crane legs 4 and 5. A CAS 6 is indicated mounted on the crane adjacent a service platform 7 and access ladder 8. The indicator bar 3 includes in this example 5 lights, green 3a, green 3b, yellow 3c, red 3d, yellow 3e. A container 9 is shown suspended under the crane trolley 2.

The chassis alignment system, CAS 6 has two main functions:
- display to the truck operator when the chassis landing area is aligned in gantry drive direction with centerline of the crane;
- optionally, to align the spreader in trolley direction to the position of the chassis. (This feature requires that the crane control is equipped with automatic positioning which can be used to follow a reference from CAS, as described below in another embodiment).

The CAS 6 is contained in a box placed at a fixed position outside the girder between landside and waterside legs. It measures the position of a truck chassis from a height of about 35 m with a 3-D laser scanner. It is looking for characteristic edges of typical targets. The mounting height is necessary to enable the CAS to have a clear view of the chassis lanes below, between the crane legs. The height also enables CAS to supervise all parallel lanes at the same time. The exact location will of course vary from different crane types depending on the most suitable position. CAS has no requirement of additional sensors or other equipment to be mounted on the chassis, since it is based on laser technology. This also makes it weather independent.

Figure 2:
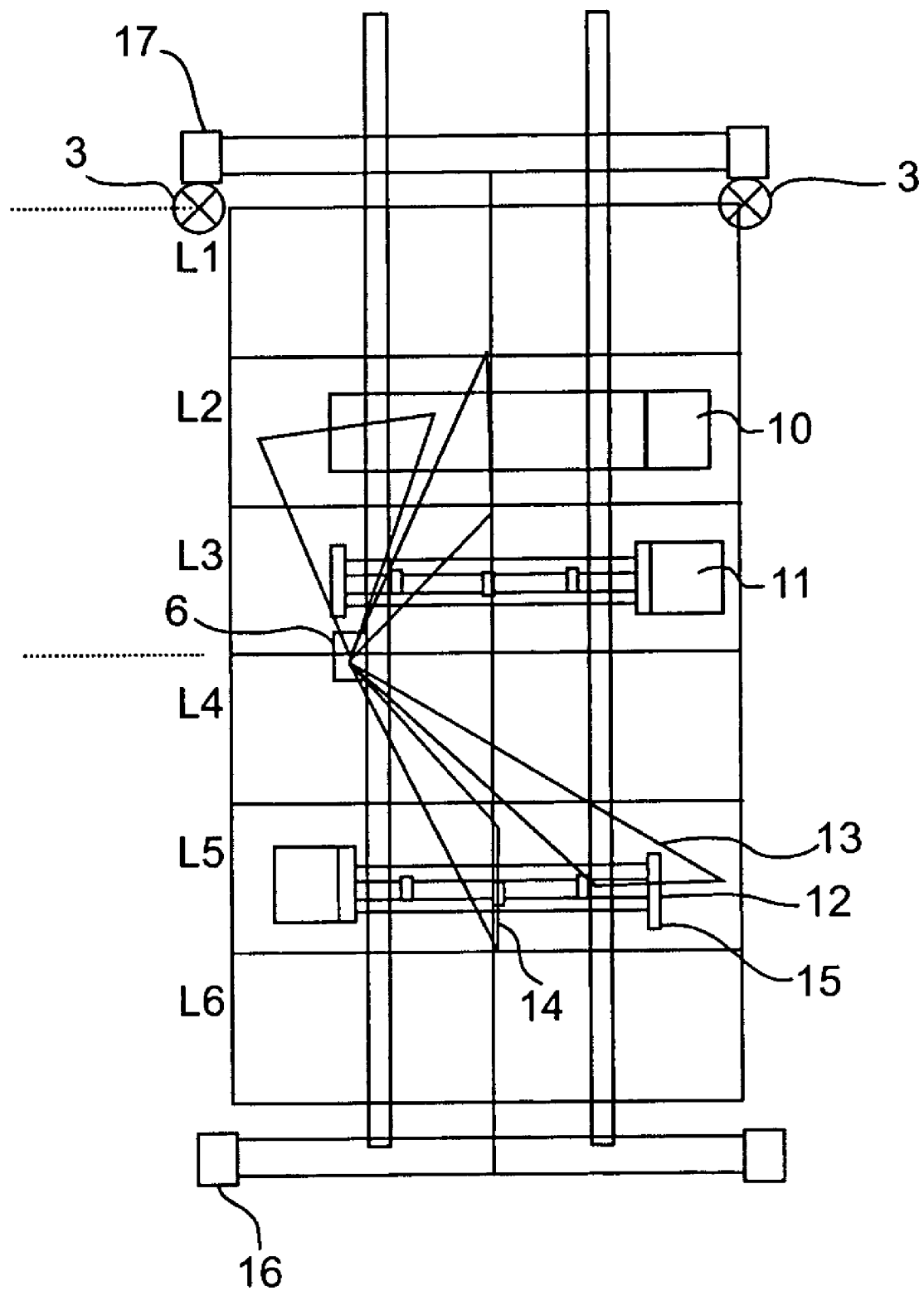
FIG. 2 is a schematic diagram of a view from above of a crane gantry and trolley positioned above a number of truck chassis in loading/unloading lanes.

FIG. 2 shows a schematic view over a multi lane area. The figure shows a view from above of six lanes L1–L6, a chassis with container coming from left 10, an empty chassis 11, an empty chassis coming from the right 12, with a rear beam 15. Four trapezoid shapes including shapes 13, 14, illustrate possible scans by the CAS 6. Scan 13 in the gentry drive direction scans to indicate the stop position of the chassis, a scan directed at the middle rear beam. Scan 14 is a trolley scan to align trolley position to chassis 12. The crane is shown positioned with waterside legs 16 and landside legs 17.

CAS communicates with the truck driver via colored lamp signals 3a–3e of the indicator bar 3, similar to traffic lights. The light bar indicates if he should stop or move forward, backward to reach the actual position for next container loading/unloading. The crane operator must in turn tell CAS what type of job he is going to do and where on the chassis the actual target is located. For this he uses different switch settings on the cabin console. (In an embodiment described below, it is related that CAS has also the possibility to interface with a control system supplied by ABB, called ELC, Electronic Load Control. ELC is an automatic positioning system with sway control and can be used to supply CAS with the next target position of the crane.)

The 3-D laser scanner in CAS 6 is able to see the target from an angle of +/−30 degrees in both gantry and trolley direction. The position of the chassis with a loaded container 10 is measured at top of the container. For an empty chassis 11, 12 the gantry position is measured at the center of the rear beam 15 of the chassis and the trolley position is measured at the middle of the chassis on the two I-beams of the chassis construction. The chassis types that are servicing the crane must be defined and loaded into CAS target database, (otherwise the vehicle will not be recognized properly).

Normally the trucks arrive at a chassis lane before the trolley arrives with the hanging load, which means that the 3-D laser scanner of CAS 6 has a clear view of the chassis and the trolley and its load does not block it. CAS is unable to measure and guide a late arriving truck, i.e. if the chassis is not in position when the trolley arrives. CAS will then flash the red and the two yellow lights on the light bar 3 to indicate a blocked view. The operator of the chassis will then have to do a manual alignment of the chassis without the help from CAS, or the crane operator has to back the trolley to clear the view and let CAS finish its measurements.

Also if the chassis lane L1–L6 to be measured is at the landside of the CAS the trolley platform and the spreader with its load can block the view of the chassis when the trolley is passing CAS and moving towards the target chassis lane. The whole idea is of course that the positioning is done before the trolley arrives. Otherwise the bottleneck lies in other parts of the terminal logistics.

To get a better understanding of how CAS operates, here is a typical job sequence.

1. CAS gets an order to measure the position of a chassis from the crane control system, the order contains information of active lane, lane direction and chassis type (if several types of chassis are utilized).
2. CAS shows a green light to allow the driver to move the chassis into the lane.
3. CAS continuously checks the selected active chassis lane and when it finds the rear part of a chassis, for example rear beam 15 on chassis 12, the yellow top light begins to flash. When the chassis is within a fixed distance to ideal position, the top yellow light becomes steady. The fixed distance can be set with a parameter.
4. CAS continues to measure the position of the chassis in crane direction and indicates red light when the chassis is within ideal position window. CAS switches to bottom yellow light (3e) if the chassis over travels. The bottom yellow light begins to flash if the over travel becomes great.

5. CAS waits until the chassis has been stopped in ideal position for a fixed time. The fixed time is set with a parameter.
6. CAS measures the trolley drive direction position of the chassis and gives feedback of the chassis position in trolley and gantry directions, and height to a crane control system (for example ELC).

A chassis type selector switch is included in the crane cabin so that the operator may switch between different types of chassis. Another switch selector selects where on the chassis to put down the container. Three predefined positions, front, center and rear can be selected in the example shown.

FIG. 3a shows a chassis selector switch 20, with three positions to choose from to select from among three different chassis types. FIG. 3b shows a load position selector switch 21. Three possible load positions are indicated in the example shown.

The Chassis type selector 20 and the Position selector 21 are only needed at a put down of a container on a chassis. At a pick up, CAS always measures at the top of the container, and then the view of the container does not depend of the type of chassis. A 45-ft container can be handled with spreader in 40-ft mode. At this kind of pick up, CAS measures the length of the container and aligns the spreader towards the center of the container.

FIG. 4a shows different loading positions for one or two containers loaded on a truck chassis. Following examples shows the different positions of the chassis for different job tasks of the crane. The Spreader position 30 indicates position of the spreader of the crane at put down (or pick up). Measure point 31 indicates that it is the top of the container that is the measurement point for a pick up. Measure point at put down 15 is as shown in FIG. 2 as it is a different view of the same object. A single 40 ft load 32 is shown in a centre position, a twin load 33 is shown with two 20 ft container loads in centre position. A 20 ft rear position 34 and a 20 ft load front position 35 is shown.

CAS can position the chassis for put down at front, center or rear. But the CAS has to know where on the chassis to put the container. Position selector (21 FIG. 3a) selects between front, centre and rear.

Figure 4B:
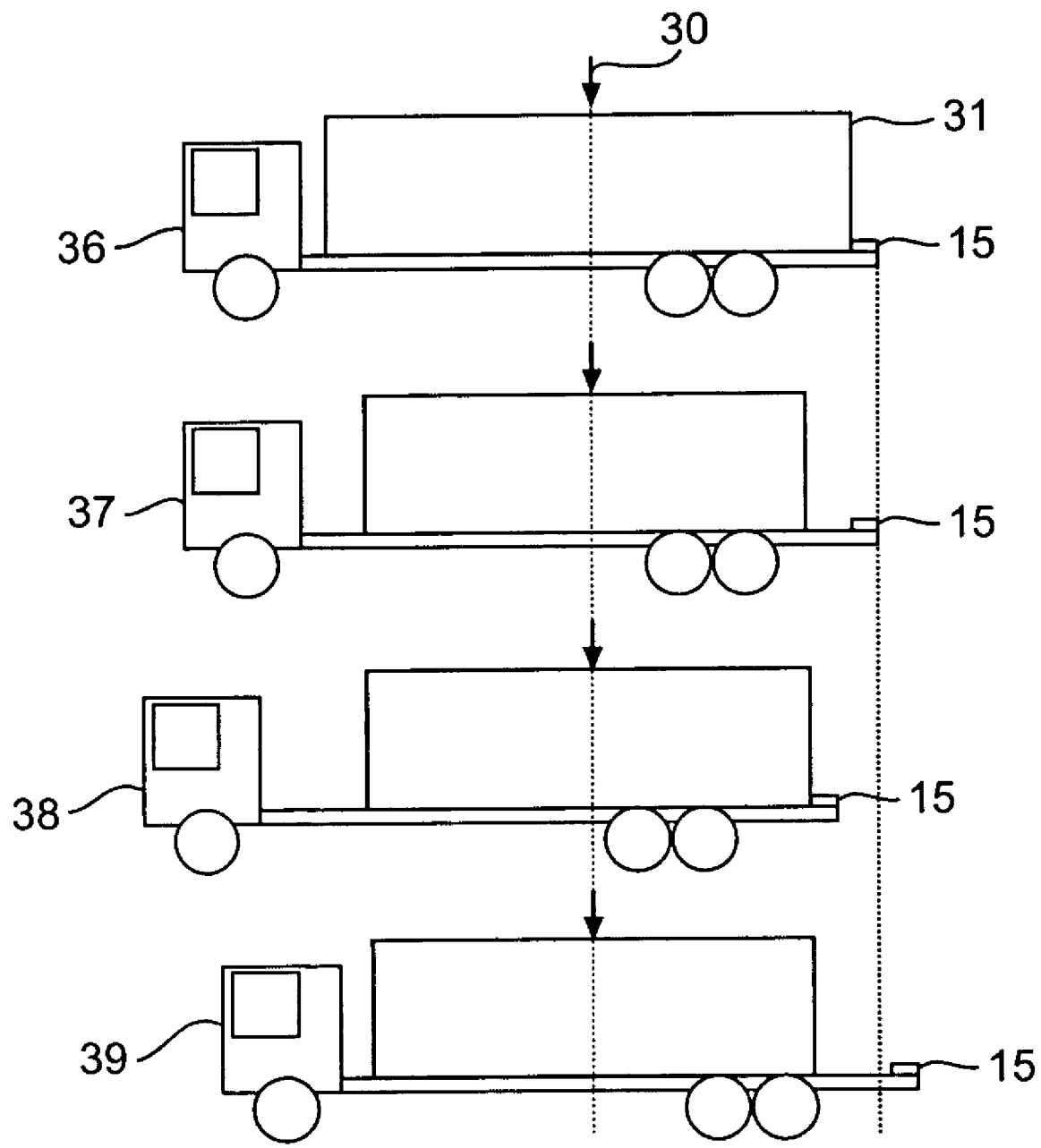
FIG. 4b is a schematic diagram of a plurality of measurement positions related to centering a load on different load positions of a truck chassis.

Similarly, FIG. 4b shows examples for load positions on a 45 ft chassis. The figure shows a Spreader position 30, a pickup measure point 31, and a measure point at put down 15. A 45 ft centre load 36 and 40 ft centre load 37 are shown. A 40 ft rear load rear position 38 and a 40 ft load front position 39 are shown. CAS normally positions the 40 ft container to the same center position as the 45 ft container because the 40 ft spreader can hold a 45 ft or 40 ft container. A 40-ft container can with the "position selector" 21 be placed at front, middle or rear.

The absolute position of the container position at the chassis of front, middle and rear can vary between container sizes (20, 40 and 45 ft) and vary between the three types of chassis. The position of the measurement point at the rear of the chassis (15) will of course also vary between the three types of chassis.

The chassis alignment system CAS 6 gets the job orders from the Crane Control System. The job order is given in different ways depending on manual or automatic operation ELC. The order and the start of measurement is made from the normal operation of the crane, i.e. the operator of the crane does not normally have to push any buttons to start the measurement of the CAS.

CAS starts measuring and positioning the chassis for next order when the trolley is moving outwards over the waterside sillbeam to pick up or put down a container on the vessel. The measurement continues until the chassis is in position and it is normally complete before the trolley comes back from the ship.

Figure 5:
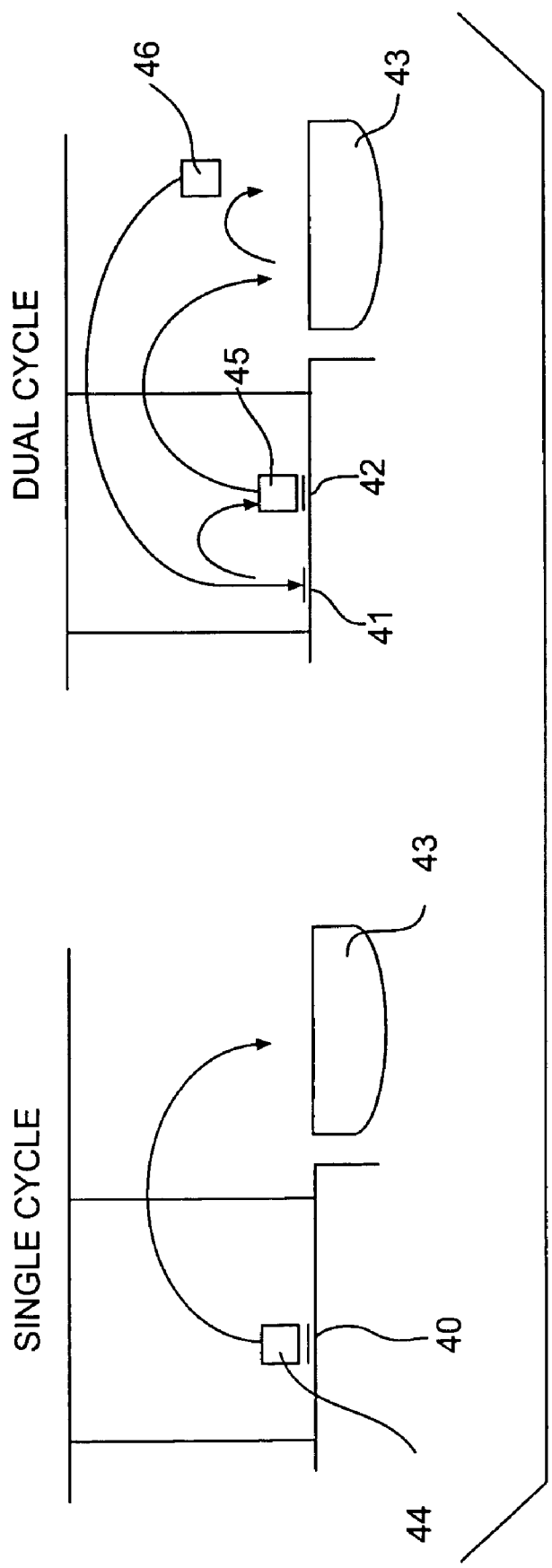
FIG. 5 is a schematic diagram showing different loading/unloading cycles.

FIG. 5 shows schematically movements of a container between one or more chassises on land and on a ship. FIG. 5 shows chassises 40, 41, 42, a ship 43 and containers 44, 46. In a single cycle container 44 is moved in one movement form one chassis 40 to the ship 43. In a double cycle, a container 45 may be moved from one chassis 41 to another chassis 42 and then to the ship 43 a indicated in the figure.

Under a manual operation the CAS 6 gets information of the destination of the next cycle, and whether it is a put down or pick up from the chassis lane. This information comes from the twistlock position of the spreader, and from one switch defining the pick up chassis lane and another switch defining the put down chassis lane. Two toggle switches define if the chassis arrives from the left or from the right. The selection of chassis lanes is normally made only once for every new ship. If desirable CAS can supervise all lanes and lock and guide the first vehicle that arrives.

In another embodiment, an automatic Electronic Load Control (ELC) operation is used. In automatic operation mode the automatic system knows the destination ahead of next cycle and gives this information to the CAS. Depending on destination of the next order the CAS can decide whether to start measuring for a pick up or put down on chassis.

Operator push buttons and switches: The operator selects with two switches in the operator's cabin the active chassis lanes for a container put down respective pick up. An additional toggle switch selects whether the chassis arrive from the left or right to the chassis lane. The selection of chassis lanes is normally made only once for every new ship.

In another embodiment, the signaling function carried out the indicator bar 3 driven by 5 digital out signals from CAS 6 may be substituted by another signaling means or display means. The same function may be carried out for example using displays, LCD displays, or pixel displays, computer monitors and the like. Similarly, the placement of the displays may be varied for effective communication to truck drivers, including positioning a display means or slave display means in a truck chassis cab.

It is also noted that while the above describes exemplifying embodiments of the invention, there are several variations and modifications which may be made to the disclosed solution without departing from the scope of the present invention as defined in the appended claims.

The invention claimed is:

1. A method for aligning a truck chassis with a required position relative to a crane, in which the truck is scanned by a sensor, the method comprising:
   locating the sensor on the crane in such a way that it will be able to scan at least one of a plurality of loading/unloading lanes,
   scanning the truck, when it enters into one of the loading/unloading lanes, in order to detect/identify at least one edge of the truck,
   measuring a distance between the identified edge of the truck and a fixed point on the crane, and
   generating a signal that enables a truck driver to drive the truck into a required position in the loading/unloading lane for accurately receiving or delivering a container.

2. The method according to claim 1, further comprising:
   scanning the truck, when it enters into one of the loading/unloading lanes, in order to detect/identify at least one edge of the truck in a crane direction, and one edge in a trolley direction.

3. The method according to claim 1, further comprising:
   selecting a truck chassis type,
   selecting a load position for the truck chassis type, signaling that a truck chassis may drive into position towards said required position to receive a load.

4. The method according to claim 3, further comprising: signaling when a first target on the truck chassis has been located.

5. The method according to claim 4, further comprising: signaling when the truck chassis is within a first predetermined distance of said required position.

6. The method according to claim 5, further comprising: signaling when the truck chassis is within an ideal window position relative to said required position.

7. The method according to claim 6, further comprising: signaling when the truck chassis has over-traveled beyond an ideal window position relative to said required position.

8. The method according to claim 7, further comprising: signaling when the truck chassis has greatly over-traveled beyond an ideal window position relative to said required position.

9. The method according to claim 8, further comprising: waiting a predetermined time when said truck chassis is determined to be in said required position.

10. The method according to claim 9, further comprising: after a predetermined time has elapsed of signaling a measured position of the truck chassis in trolley direction, gantry direction, and height, to a crane control system.

11. The method according to claim 1, wherein the sensor means comprises a laser scanner.

12. The method according to claim 2, wherein the crane direction is a direction from the rear and/or front end of the truck and the trolley direction is from side to side of the truck.

13. The method according to claim 3, wherein signaling that a truck chassis may drive into position towards said required position to receive a load comprises illuminating a light.

14. The method according to claim 4, wherein signaling when a first target on the truck chassis has been located comprises intermittent illumination of a light.

15. The method according to claim 5, wherein signaling when the truck chassis is within a first predetermined distance of said required position comprises steady illumination of a light.

16. The method according to claim 6, wherein signaling when the truck chassis is within an ideal window position relative to said required position comprises illuminating a light.

17. The method according to claim 7, wherein signaling when the truck chassis has over-traveled beyond an ideal window position relative to said required position comprises steady illumination of a light.

18. The method according to claim 8, wherein signaling when the truck chassis has greatly over-traveled beyond an ideal window position relative to said required position comprises intermittent illumination of a light.

19. A system for aligning a truck chassis in relation to a crane, including a sensor means for identifying the truck position, a computer for processing measurements made by the sensor means and a signal lamp array for signalling to a driver of the truck, wherein
the sensor means is a laser scanner arranged on the crane and covering at least one of a plurality of loading/unloading lanes and, wherein the laser scanner is arranged to scan the truck when it enters into one of the loading/unloading lanes in order to detect/identify at least one edge of the truck, and wherein the computer is arranged to calculate a distance between the identified edge of the truck and a fixed point on the crane and thereby generate a signal that enables a truck driver to drive the truck into a required position in the loading/unloading lane for accurately receiving or delivering a container.

20. The system according to claim 19, further comprising: a truck chassis selector comprising selection means for selecting one of several predetermined types of truck chassis from a plurality of known truck chassis types stored in the computer.

21. The system according to claim 20, further comprising: a load position selector comprising selection means for selecting one of several predetermined load positions available on different types of truck chassis from a plurality of known load positions stored in the computer.

22. The system according to claim 19, wherein the laser scanner is a 3-D laser camera.

23. The system according to claim 19, wherein the laser scanner comprises a Class A laser.

24. The system according to claim 19, wherein the system provides a measurement signal so as to load/unload a container onto/from a pre-selectable load position.

25. The use according to claim 24, wherein the pre-selectable load position comprises a front, middle or rear load position of a truck chassis.

26. A computer program code element, comprising computer code means for enabling a a processor to carry out one or more of a series of steps of:
locating a sensor on a crane in such a way that it will be able to scan at least one of a plurality of loading/unloading lanes,
scanning a truck, when it enters into one of the loading/unloading lanes, in order to detect/identify at least one edge of the truck,
measuring a distance between the identified edge of the truck and a fixed point on the crane, and
generating a signal that enables a truck driver to drive the truck into a required position in the loading/unloading lane for accurately receiving or delivering a container.

27. A computer program contained at least in part in a computer readable medium, comprising computer program code means to make a processor carry out the steps of:
locating a sensor on a crane in such a way that it will be able to scan at least one of a plurality of loading/unloading lanes,
scanning a truck, when it enters into one of the loading/unloading lanes, in order to detect/identify at least one edge of the truck,
measuring a distance between the identified edge of the truck and a fixed point on the crane, and
generating a signal that enables a truck driver to drive the truck into a required position in the loading/unloading lane for accurately receiving or delivering a container.

28. A method of aligning a truck chassis with a predetermined position relative to a crane, the method comprising:
scanning the truck chassis with a sensor to identify at least one edge of the truck chassis;
measuring a distance between the at least one edge of the truck chassis and a point on the crane with the sensor; and
generating signals indicating a position of the truck chassis based on the measured distance.

* * * * *